(12) United States Patent
Dybsetter et al.

(10) Patent No.: US 7,526,208 B2
(45) Date of Patent: Apr. 28, 2009

(54) CHANGING TRANSCEIVER MODULE DEVICE ADDRESSES USING A SINGLE HOST INTERFACE

(75) Inventors: Gerald L. Dybsetter, Scotts Valley, CA (US); Luke M. Ekkizogloy, San Jose, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 410 days.

(21) Appl. No.: 11/114,317

(22) Filed: Apr. 26, 2005

(65) Prior Publication Data

US 2006/0239690 A1 Oct. 26, 2006

(51) Int. Cl.
*H04B 10/24* (2006.01)
(52) U.S. Cl. .......................................... 398/166; 398/67
(58) Field of Classification Search ................. 398/135, 398/166, 66–67
See application file for complete search history.

(56) References Cited

U.S. PATENT DOCUMENTS

| 5,270,898 | A | * | 12/1993 | Elms et al. .................... 361/96 |
| 6,546,441 | B1 | | 4/2003 | Lum |
| 2002/0181894 | A1 | | 12/2002 | Gilliland et al. |
| 2004/0022537 | A1 | | 2/2004 | Mecherle et al. |
| 2005/0031347 | A1 | * | 2/2005 | Soto et al. ...................... 398/58 |
| 2005/0097255 | A1 | * | 5/2005 | Barenys et al. ............... 710/316 |
| 2005/0138217 | A1 | * | 6/2005 | Therisod et al. ................. 710/1 |
| 2006/0110157 | A1 | * | 5/2006 | Tritschler et al. ............. 398/22 |
| 2006/0216958 | A1 | | 9/2006 | Yee et al. |
| 2006/0242437 | A1 | * | 10/2006 | Jovanovich .................. 713/300 |
| 2006/0253744 | A1 | * | 11/2006 | Mayes et al. ................... 714/43 |
| 2007/0033265 | A1 | * | 2/2007 | Anderson et al. ............ 709/217 |

* cited by examiner

*Primary Examiner*—Leslie Pascal
(74) *Attorney, Agent, or Firm*—Workman Nydegger

(57) ABSTRACT

A method for changing the host communication interface address for a number of individual optical transceivers sharing a single host communication interface. An optical transceiver host computing system is communicatively coupled to the transceivers using the single host communication interface. The host computing system implements the host interface address change by indicating to a first transceiver that an address change is pending. The host then informs the first transceiver that it is to have its address changed using a mechanism independent of the addressing mechanism used by the signal host communication interface. In response, the first transceiver makes the address change. The other optical transceivers may have their address changed using the same method, although this is not required.

21 Claims, 3 Drawing Sheets

CHANGING TRANSCEIVER MODULE DEVICE ADDRESSES USING A SINGLE HOST INTERFACE

BACKGROUND OF THE INVENTION

1. The Field of the Invention

The present invention relates generally to optical transceivers and optical transceiver host computing systems (hereinafter referred to simply as "host"). More specifically, the present invention relates to a method for optical transceiver hosts to change the host interface address of multiple optical transceiver modules.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed therethrough, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to as the "controller") controls the operation of the laser driver and post amplifier.

The controller typically is coupled to an external host by a host communication interface. The external host uses the host communication interface to provide commands to the controller. The host communication interface implements an interface protocol in which each specific transceiver coupled to the host is identified by an interface address.

Optical transceivers using the same host communication interface protocol, however, share the same interface address. This has led to problems when multiple transceivers share the single host communication interface protocol such as I²C. For example, a data instruction addressed to one transceiver is addressed to all of the other transceivers using the same host communication interface protocol. A solution to this problem has been the use of a Field Programmable Gate Array (FPGA) or other dedicated hardware in the host. The FPGA or other dedicated hardware act as a router by determining which of the multiple transceivers is to receive the addressed data. Implementing the dedicated hardware is often costly and ties up valuable host computing resources.

Therefore, what would be advantageous is a mechanism for the host to change the host communication interface address for each individual transceiver so that a single host communication interface may be used for communication with multiple transceivers.

BRIEF SUMMARY OF THE INVENTION

The forgoing problems with the prior state of the art are overcome by the principles of the present invention. The principles of the present invention relate to an environment that includes an optical transceiver host computing system (hereinafter referred to simply as "host") communicatively coupled using a host communication interface to multiple optical transceivers. The host is able to change the communication interface address for each transceiver so as to give each transceiver a unique interface address even though the optical transceivers may initially have the same address under the addressing mechanism of the host communication interface.

The host notifies a first optical transceiver that a host interface address change is pending. The host may also notify other optical transceivers, although this is not required. The host then informs is the first optical transceiver that it is to undergo the interface address change using a mechanism other than the addressing mechanism of the host communication interface. In response, the first optical transceiver undergoes the address change. This procedure may be repeated for multiple optical transceivers until each has a unique address under the addressing mechanism of the host communication interface.

Since the host may change the host interface address of all the individual transceivers to a unique host interface address, a single host communication interface protocol may be shared by multiple optical transceivers. This removes the need for separate dedicated hardware in the host to determine which of the multiple transceivers data is addressed to. Valuable host resources are thus saved for other important tasks.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to a method for changing the host communication interface address for a number of individual optical transceivers sharing a single host communication interface. An optical transceiver host (hereinafter referred to as "host") is communicatively coupled to the multiple transceivers using the single host communication interface. The host implements the host interface address change by indicating to the first optical transceiver that an address change is pending. The host then informs the first transceiver is to change it address using an identification mechanism other than the addressing mechanism supported by the host communication interface. In response, the first transceiver completes the address change. This procedure may be repeated for multiple optical transceivers until each has a unique address under the addressing mechanism of the host communication interface.

An example operational optical transceiver environment will first be described. Then, the operation in accordance with the invention will be described with respect to the operational environment.

Figure 1:
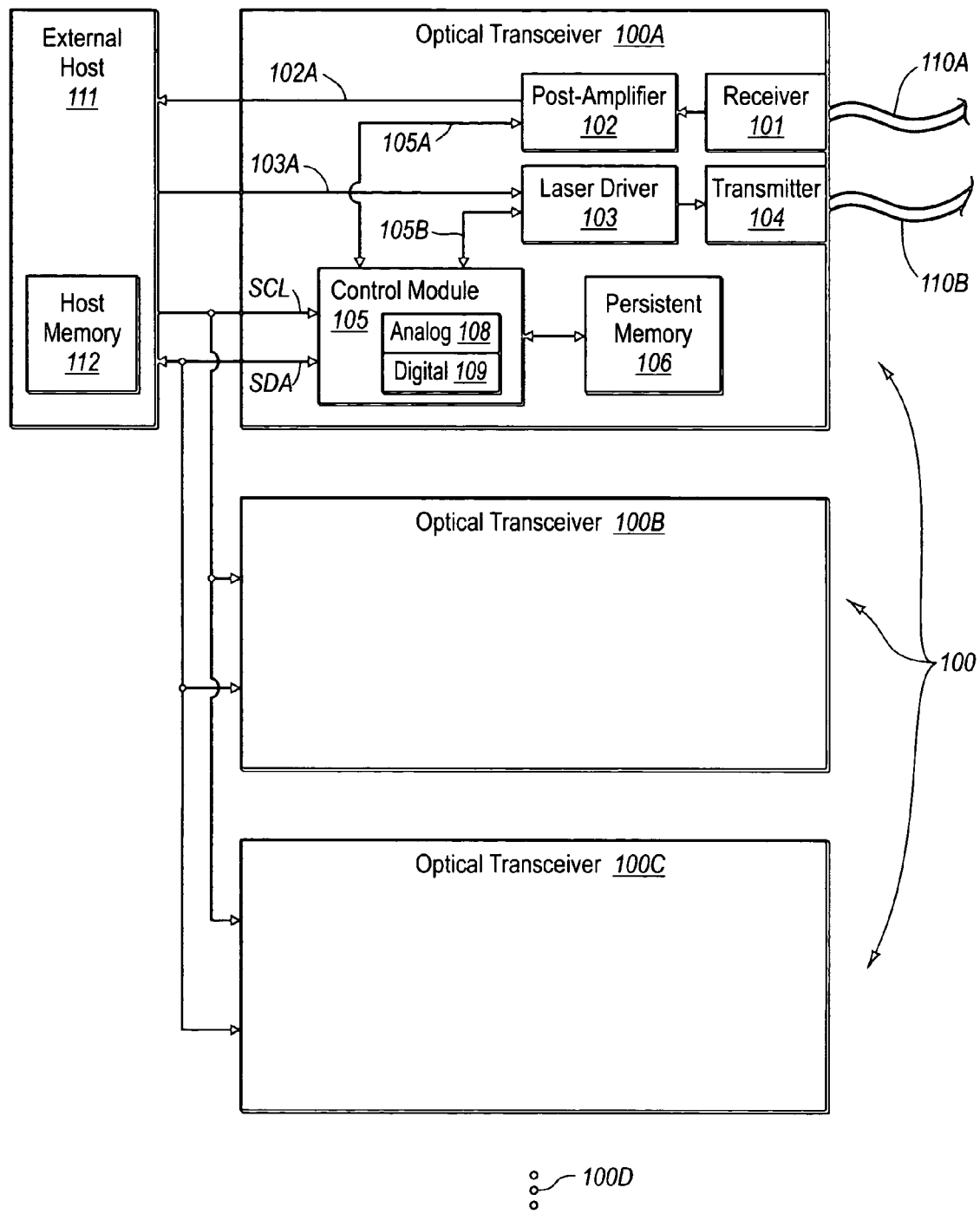
FIG. 1 schematically illustrates an example environment including a host computing system and multiple optical transceivers that may implement features of the present invention.

FIG. 1 illustrates an environment 100 in which the principles of the present invention may be employed. The environment 100 includes multiple optical transceiver modules 100A, 100B, and 100C communicatively coupled to the host 111 using a single host communication interface. Ellipses 100D indicate that there may be any number of additional individual transceivers coupled to the host 111 using this interface. Transceivers 100B, 100C and 100D may have the same functionality as transceiver 100A, which will now be described in further detail. Specifically, the receivers, post-amplifiers, laser drivers, transmitters, and control modules of transceivers 100B, 100C and 100D may be identical to and have the same functionality as receiver 101, post-amplifier 102, laser driver 103, transmitter 104, and control module 105 of transceiver 100A that will now be described. While transceiver 100A will be described in some detail, the optical transceiver 100A is described by way of illustration only, and not by way of restricting the scope of the invention. The principles of the present invention are suitable for 1G, 2G, 4G, 10G and higher bandwidth fiber optic links. Furthermore, the principles of the present invention may be implemented in optical (e.g., laser) transmitter/receivers of any form factor such as XFP, SFP and SFF.

The optical transceiver 100A receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100A. The external host 111 may contain a host memory 112 that may be a volatile or non-volatile memory source. In one embodiment, the optical transceiver 100A may be a printed circuit board or other components/chips within the host 111, although this is not required.

The optical transceiver 100A may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transmitter/receiver 100A includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant.

The control module 105 may have access to a persistent memory 106, which in one embodiment, is an Electrically Erasable and Programmable Read Only Memory (EE-PROM). Persistent memory 106 may also be any other non-volatile memory source.

As part of the host communication interface, data and clock signals may be provided from the host 111 to the control module 105 using the serial clock line SCL, and the serial data line SDA. Also data may be provided from the control module 105 to the host 111 using serial data line SDA to allow for digital diagnostics and readings of temperature levels, transmit/receiver power levels, and the like. Although a specific host interface is described in which a clock signal SCL and a data signal SDA are used to communicate with the host, various other host communication interfaces may be employed between the host and optical transceiver within the scope of the present invention.

Figure 2:
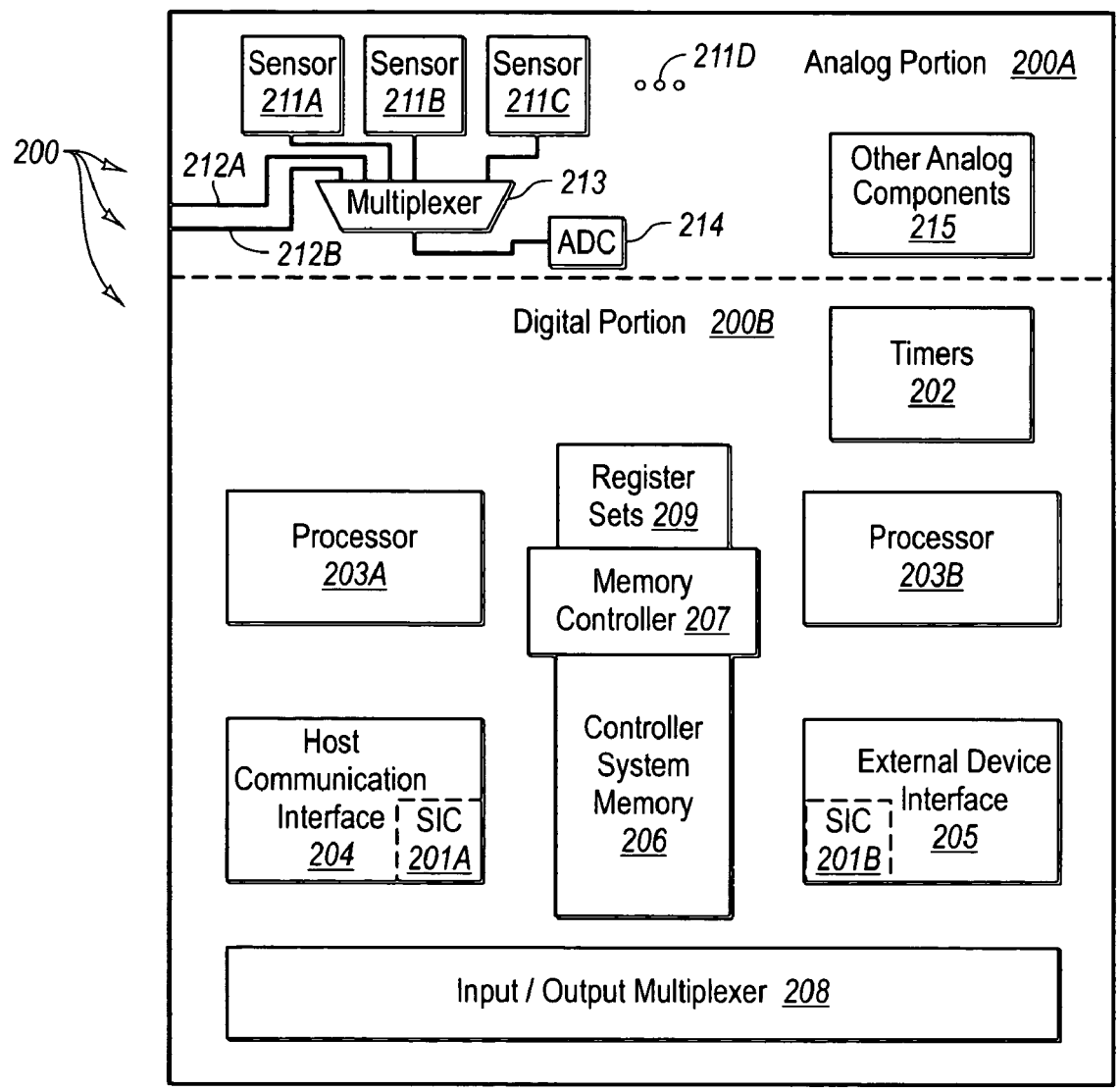
FIG. 2 schematically illustrates an example of the control module of FIG. 1.

The control module 105 includes both an analog portion 108 and a digital portion 109. Together, they allow the control module to implement logic digitally, while still largely interfacing with the rest of the optical transceiver 100A using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components. The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111 using the serial data (SDA) and serial clock (SCL) lines of the optical transceiver 100A. The external device interface 205 is used to communicate with, for example, other modules within the optical transceiver 100A such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as $I^2C$ or may be another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then existing operational circumstances of the control module 200. Accordingly, there may be more input/output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transceiver 100A. Alternatively, the registers may hold data selecting operational parameters for comparison. Additionally, the registers may be memory mapped to the various components of optical transceiver 100A for controlling aspects of the component such as laser bias current or transmit power.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to a method for changing the host communication interface address for each of the individual transceiver modules communicatively coupled to the host using a single host communication interface. The principles of the present invention will be discussed with reference to the environment described in relation to FIGS. 1 and 2.

Referring again to FIG. 1, a host 111 is shown communicatively coupled to a number of transceiver modules 100A, 100B, 100C, and 100D using a single host communication interface. In this description and in the claims, "communicatively coupled" is defined as being capable of communicating data either one way or bi-directionally. Additionally, in this description and in the claims, "optical transceiver host" and "host computing system" are defined as any device external to a transceiver that provides any type of electrical signal to the transceiver. In FIG. 1, the host communication interface is shown to be a two-wire interface that supports an interface protocol such as $I^2C$ as represented by the SDA and SCL lines. This is for illustration purposes only and should not be read to limit the claims. The principles of the present invention may work equally well for other types of host communication interfaces.

As with other transceiver modules, transceivers 100A, 100B, 100C, and 100D may have the same host interface address when they are initially connected to the single host interface using the same host interface protocol. For example, transceivers 100A, 100B, 100C, and 100D may have the $I^2C$ interface protocol address. Host 111 may make use of the fact that transceivers 100A, 100B, 100C, and 100D have the same host interface address to make a change to those addresses.

Figure 3:
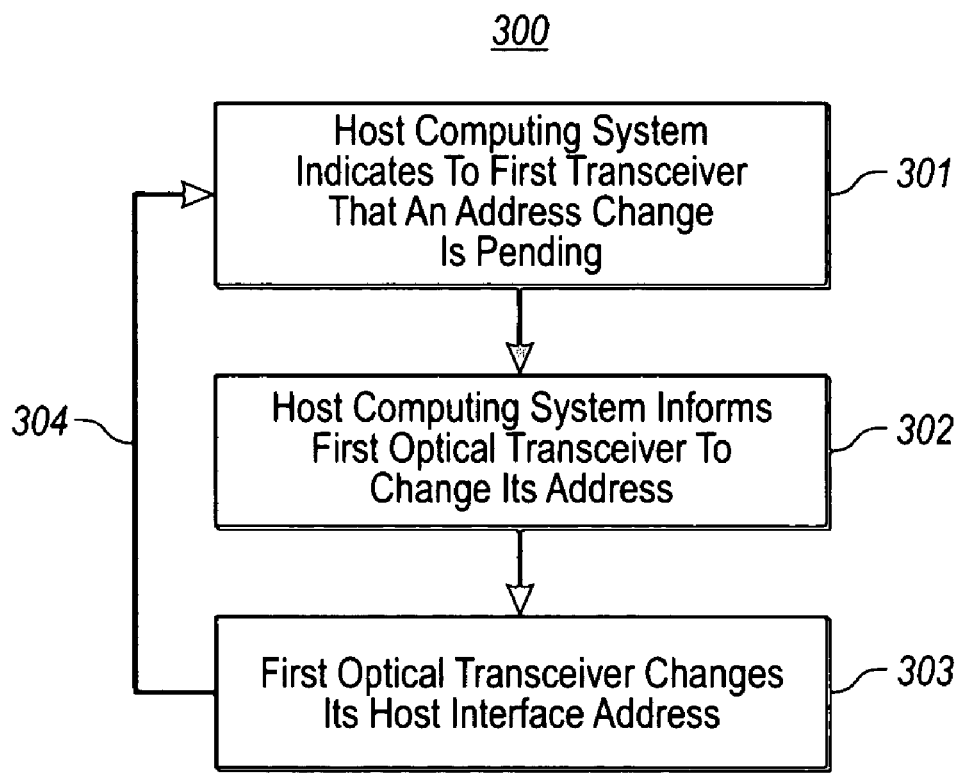
FIG. 3 illustrates a method for an optical transceiver host computing system to change the host interface address of an optical transceiver in accordance with the principles of the present invention.

FIG. 3 illustrates a flowchart of a method 300 for an optical transceiver host computing system to individually change the host interface address of an optical by transceiver. First, the host indicates to a first optical transceiver that an interface address change is pending (act 301). The host may also indicate to the other optical transceivers that an address change is pending while indicating the address change to the first optical transceiver, although this is not required. This may be accomplished by the host indicating to the first optical transceiver and potentially all optical transceivers using the host communication interface that an address change is about to occur. This may be accomplished by the host computing system sending to each optical transceiver an address change request. For example, referring to FIGS. 1 and 2, host 111 may send the data request using the illustrated I²C interface to optical transceivers 100A, 100B, 100C and potentially 100D. The change of address request may be written in each transceiver's controller system memory 206.

Figure 4:
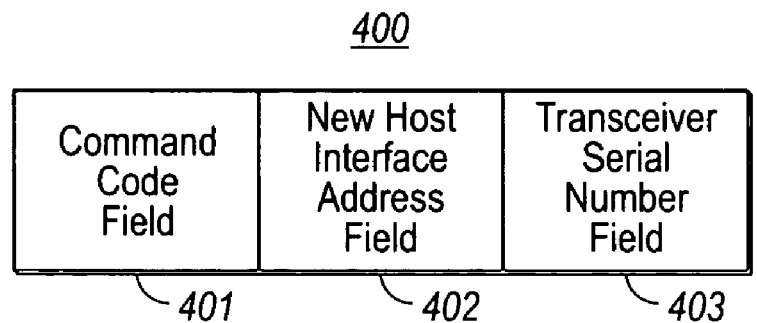
FIG. 4 illustrates an address change request that may be used by the optical transceiver host computing system to change the interface address of individual optical transceivers.

An address change request 400 is illustrated in FIG. 4. Address change request 400 contains the information that the host must communicate to the optical transceiver in order to accomplish an address change. For instance, address change request 400 may contain a command code field 401 that identifies the command as being an address change. In response, the optical transceivers may write the address change request 400 to a memory location. Note that the address change request 400 may be payload data for a host communication, where that payload data has additional headers and/or footers that use the addressing mechanism of the host communication interface.

The host then informs the first optical transceiver to change its interface address (act 302) using an identification mechanism that is independent of the addressing mechanism of the host communication interface. The host may also inform the other optical transceivers to change their host interface addresses, although this is not required. This may be accomplished using the same address change request 400. In particular, the address change request 400 includes a transceiver serial number field 403, which includes an identification of the unique vendor serial number assigned to the optical transceiver that is to be subjected to the address change. Note that act 302 is illustrated as occurring after act 301, in the example of the address change request 400, they occur simultaneously. These serial numbers may act as a unique identifier for each individual transceiver.

Finally, the first transceiver changes its host interface address to the provided new host interface address (act 303). The other optical transceivers may also change their host interface addresses. In particular, each optical transceiver may evaluate the address change request 400. Once each transceiver determines that the command code field 401 is a command for an address change, the optical transceiver may then evaluate the transceiver serial number field 403 of the address change 400. If the transceiver serial number read from the transceiver serial number field 403 does not match the optical transceiver's serial number, then the optical transceiver has completed processing of the address change request 400. On the other hand, if the transceiver serial number read from the transceiver serial number field 403 matches the optical transceiver's serial number, then the optical transceiver reads the new host interface address field 402 to obtain the optical transceivers new address. From that point on, that identified optical transceiver will use the new address when using the addressing mechanism of the host communication interface.

The process may be repeated as needed as represented by arrow 304, until at the conclusion of the address change phase, all the individual transceivers sharing the single host communication interface should have a unique interface address. It should be noted that it is not necessary that each individual optical transceiver change its interface address in order for each transceiver to have a unique address. In some embodiments, one of the transceivers may keep the original interface address. For example, transceiver 100A may retain the original interface address while transceivers 100B and 100C change their interface address in the manner described.

Verification of the new address may then be performed to ensure that transceivers the transceivers successfully changed their interface addresses. This may be accomplished by having the host 111 read the serial number of each individual transceiver. If the serial number is what host 111 expects it to be, then the change of address was successful. If the serial number was not what was expected or if an individual transceiver continued to respond to the old interface address, then host 111 may repeat the interface address process described above until the interface address change is successfully made.

In a second embodiment, it may be possible for host 111 to change the interface address of transceivers 100A, 100B, 100C, and 100D by making use of a physical interface different from the host communication interface. In this embodiment, as in the previous embodiment, transceivers 100A, 100B, 100C, and 100D may initially have the same interface address. Host 111 may write address change data to transceivers 100A, 100B, 100C, and 100D informing the transceivers of the desire to make an interface address change. This data may inform the individual transceivers that one of them will be physically selected for the address change. If a transceiver is physically selected, then that transceiver may be directed to receive data containing a new interface address. If the transceiver is not selected, then the optical transceiver will ignore the data containing the new interface address.

Transceivers 100A, 100B, 100C, and 100D may all have separate rate select and disable pins that are connected to host 111 independently of the host communication interface. When transceivers 100A, 100B, 100C, and 100D receive the data informing them of a pending address change, the transceivers enter an address change mode. Host 111 may then toggle or wiggle the rate select pin, the disable pin, or some other pin of a first individual transceiver. This may inform the transceiver that is has been selected for an address change. The selected transceiver would then receive further data from host 111 containing the new interface address and would permanently change its interface address by writing the new interface address to the memory location containing the interface address. The non-selected transceivers would ignore the data containing the new interface address. In this way, the host interface address of a first transceiver is changed to a host interface address different from a second transceiver while not changing the interface address of the second transceiver. This process may be repeated as many times as necessary until each individual transceiver has a new, unique host interface address.

For example, suppose that transceivers 100A, 100B, 100C, and 100D were all connected to a single two-wire host interface and all had a host interface address of 1. Further suppose that host 111 desired to change the transceiver 100B's host interface address to 2. Host 111 would send out data to all the transceivers with an address of 1 informing the transceivers that an address change was pending and to watch for a toggle or wiggle of the rate select or disable pin. This would put all the transceivers in address change mode. Transceivers 100A, 100B, 100C, and 100D would then wait for a pin to be toggled. In this case, only transceiver 100B would have a pin toggled. Host 111 would then send data containing the new interface address over the host communication interface. Only transceiver 100B would pay attention to this data and would permanently change its interface address from 1 to 2. Transceivers 100A, 100C and 100D would ignore the data and would retain a host interface address of 1. The process may be repeated as needed. Once the address changes have been made it may be possible to verify that the changes were successful. In this embodiment, verification may be performed by addressing data to the old, shared interface address. If any individual transceiver still responded to the old address, then the host 111 would know that the address change procedure was not successful. Host 111 may then repeat the process as described until all the interface address changes were a success.

In some embodiments, it may be desirable to change the host interface address of an optical transceiver even though it is the only transceiver implemented on a host interface. Since all the optical transceivers from a particular manufacturer may have the same host interface address, a user may desire to make the address change for security reason. Alternatively, a user may implement other devices on the interface and so desire to change the optical transceiver's address. Regardless of the motivation, the principles of the present invention may be applied. The host would indicate to the single optical transceiver that a host interface address change is pending. This may be accomplished in any of the methods already discussed such as through use of address change request 400. The then informs the single optical transceiver to change it address in any of the ways already discussed. The single optical transceiver may then make the address change.

Accordingly, the principles of the present invention provide for a method to change the host communication interface address for a group of optical transceivers sharing a single host communication interface. The host selects the individual transceiver that is to have its address changed. The host then sends data containing the new address to the transceiver. This process can be repeated as necessary until all the individual transceivers have a new host interface address. In this way, a single host communication interface can support a large number of individual transceivers. This removes the necessity of separate host interfaces and the need for expensive dedicated hardware in the host to implement communication across all the separate host interfaces. Valuable host computing resources are saved for other computing needs. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an environment that includes an optical transceiver host computing system communicatively coupled using a protocol to each of a plurality of optical transceivers including at least a first optical transceiver and a second optical transceiver, wherein the protocol uses an addressing mechanism and in which the first and second optical transceiver each have the same host interface address under the addressing mechanism, a method for the optical transceiver host computing system to change a host interface address of the first optical transceiver without changing a host interface address of the second optical transceiver, the method comprising:

an act of the optical transceiver host computing system indicating to the first optical transceiver and the second optical transceiver that an address change is pending in an address change request, wherein the address change request includes a new host interface address for the first optical transceiver; and an act of the optical transceiver host computing system using a mechanism other than the addressing mechanism of the protocol to inform the first optical transceiver to change its host interface address, wherein the first optical transceiver changes its host interface address while the second optical transceiver does not change its host interface address in response to the address change request.

2. A method in accordance with claim 1 further comprising:

an act of the first optical transceiver changing its host interface address.

3. A method in accordance with claim 1, wherein the act the optical transceiver host computing system indicating to the first optical transceiver that an address change is pending further comprises:

an act of indicating to the second optical transceiver that an address change is pending.

4. A method in accordance with claim 1, wherein the act of the optical transceiver host computing system using a mechanism other than the addressing mechanism of the protocol to inform the first optical transceiver to change its host interface address does not cause a corresponding address change for the second optical transceiver.

5. A method in accordance with claim 1, further comprising:

an act of the optical transceiver host computing system indicating to the second optical transceiver that an address change is pending; and an act of the optical transceiver host computing system using a mechanism other than the addressing mechanism of the protocol to inform the second optical transceiver to change its host interface address.

6. A method in accordance with claim 1, wherein the act of the optical transceiver host computing system using a mechanism other than the addressing mechanism of the protocol to inform the first optical transceiver to change its host interface address comprises the following:

an act of the optical transceiver host computing system using a portion of a protocol frame other than an addressing portion of the frame to uniquely identify the first optical transceiver.

7. A method in accordance with claim 6, wherein the portion of the protocol frame other than an addressing portion of the frame identifies a serial number of the first optical transceiver.

8. A method in accordance with claim 1, wherein the act of the optical transceiver host computing system using a mechanism other than the addressing mechanism of the protocol to inform the first optical transceiver to change its host interface address comprises the following:

an act of the optical transceiver host computing system using a different physical interface to identify that the first optical transceiver is to be subjected to the address change.

9. A method in accordance with claim 8, wherein the different physical interface is an optical transceiver input/output pin.

10. A method in accordance with claim 9, wherein the optical transceiver host computing system toggles the optical transceiver input/output pin.

11. A computing system comprising the following:

a first optical transceiver having a first protocol address;

a second optical transceiver having the first protocol address; and a host computing system communicatively coupled to each of the first and second optical transceivers using a protocol;

wherein the host computing system is configured to indicate to the first and second optical transceivers that a host interface address change is pending and selects which of the first or second optical transceivers is to be subjected to the host interface address change in an address change request despite the first and second optical transceivers initially having the same first protocol address, wherein the selected optical transceiver is identified using a mechanism other than the first protocol address, wherein the address change request includes a new protocol address for the selected optical transceiver and wherein the selected optical transceiver changes the first protocol address to the new protocol address and the unselected optical transceiver does not change the first protocol address in response to the address change request.

12. A computing system in accordance with claim 11, wherein the first optical transceiver changes its host interface address in response to being subjected to the host interface address change.

13. A computing system in accordance claim 11, wherein the host computing system selects which of the first or second optical transceiver is to be subjected to a host interface address change by using a portion of the protocol frame to uniquely identify either the first or second optical transceiver.

14. A computing system in accordance with claim 13, wherein the portion of the protocol frame is a serial number.

15. A computing system in accordance claim 11, wherein the host computing system selects which of the first or second optical transceivers is to be subjected to a protocol address change by using a different physical interface to identify which one of the first and second optical transceivers is to be subjected to the address change.

16. A computing system in accordance with claim 15, wherein the different physical interface is an optical transceiver pin.

17. A computing system in accordance with claim 16, wherein the optical transceiver host computing system toggles the optical transceiver pin.

18. A computing system in accordance with claim 11, wherein the first and second optical transceivers are one of a 1G laser transceiver, a 2G laser transceiver, a 4G laser transceiver, a 8G laser transceiver, or a 10G laser transceiver.

19. A computing system in accordance with claim 11, wherein the first and second optical transceivers are a laser transceiver suitable for fiber optic links greater than 10G.

20. A computing system in accordance with claim 11, wherein the first and second optical transceivers are one of a XFP laser transceiver, a SFP laser transceiver, or a SFF laser transceiver.

21. In an environment that includes an optical transceiver host computing system communicatively coupled using a protocol to a plurality of optical transceivers that are each connected to a host computing system using a single host communication interface, wherein the protocol uses an addressing mechanism, a method for the optical transceiver host computing system to change a host interface address of a first optical transceiver, the method comprising:

an act of the optical transceiver host computing system indicating to the plurality of optical transceivers that an address change is pending; and an act of the optical transceiver host computing system using a mechanism other than the addressing mechanism of the protocol to inform the first optical transceiver to change its host interface address without disconnecting any of the plurality of optical transceivers from the single host communication interface.

* * * * *

UNITED STATES PATENT AND TRADEMARK OFFICE
CERTIFICATE OF CORRECTION

PATENT NO. : 7,526,208 B2
APPLICATION NO. : 11/114317
DATED : April 28, 2009
INVENTOR(S) : Dybsetter et al.

It is certified that error appears in the above-identified patent and that said Letters Patent is hereby corrected as shown below:

Column 1
Line 66, change "act" to --acts--

Column 2
Line 26, remove the first instance of [is]

Column 3
Line 22, change "is to change it" to --to change its--

Column 4
Lines 62-63, change "generator" to --generators--

Column 5
Line 30, change "generator" to --generators--
Line 40, change "operation" to --operations--

Column 6
Line 64, remove [by]

Column 7
Line 56, change "transceivers" to --transceiver's--

Column 8
Line 5, remove the [the transceivers]
Line 37, change "is" to --it--

Column 9
Line 14, change "reason" to --reasons--
Line 22, change "The then" to --The host then--

Signed and Sealed this
Twelfth Day of April, 2011

David J. Kappos
*Director of the United States Patent and Trademark Office*

CERTIFICATE OF CORRECTION (continued)
U.S. Pat. No. 7,526,208 B2

Line 22, change "it" to --its--

Column 10
Line 13, change "act the" to --act of the--